(12) United States Patent
Kirjanen (10) Patent No.: US 6,483,294 B1
(45) Date of Patent: Nov. 19, 2002

(54) TRANSDUCER FEATURING MAGNETIC ROTOR CONCENTRICALLY ARRANGED IN RELATION TO MULTI-PHASE COIL

(75) Inventor: Jari Kirjanen, Nokia (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/511,755

(22) Filed: Feb. 24, 2000

(51) Int. Cl.$^7$ ................ G01B 7/14; G01B 7/30
(52) U.S. Cl. ............ 324/207.15; 324/207.24; 324/207.25; 324/207.26; 324/260
(58) Field of Search ............ 324/207.15, 207.14, 324/207.16, 207.17, 207.24, 207.25, 260; 463/36, 37, 38; 273/148 R, 148 B; 345/156–161, 167; 178/20.21, 20.04

(56) References Cited

U.S. PATENT DOCUMENTS

| | | | | |
|---|---|---|---|---|
| 4,395,711 A | * | 7/1983 | Ward | 340/870.31 |
| 4,626,759 A | | 12/1986 | McBrien | 318/689 |
| 4,651,130 A | | 3/1987 | Pennell | 340/347 |
| 4,661,753 A | | 4/1987 | McBrien et al. | 318/689 |
| 5,489,845 A | * | 2/1996 | Weber et al. | 324/207.25 |

FOREIGN PATENT DOCUMENTS

| | | | |
|---|---|---|---|
| JP | 61042023 | * | 2/1986 |
| WO | 9830971 | | 7/1998 |

* cited by examiner

*Primary Examiner*—Edward Lefkowitz
*Assistant Examiner*—Reena Aurora
(74) *Attorney, Agent, or Firm*—Ware, Fressola, Van Der Sluys & Adolphson LLP (57) ABSTRACT

A roller responds to a force applied by a user, for providing a multi-phase coil signal containing information about the force applied by the user. The roller has a magnetic rotor and a multi-phase coil member. The magnetic rotor responds to the force applied by the user, for providing a magnetic rotor force. The multi-phase coil member responds to the magnetic rotor force, for providing a multi-phase coil signal containing information about the force applied by the user. The force applied by the user may include a rotational force applied by the user to a track ball or any force applied by the user to a mouse that causes the roller to move or rotate. In this case, the multi-phase coil signal contains information about the force applied on the track ball or mouse by the user. The roller may also respond to roller driving signals, for example, from a host system or other circuitry, for rotating the roller about the main roller axis. In this case, the multi-phase coil member responds to the roller driving signals, for providing multi-phase coil driver signals. The magnetic rotor responds to the multi-phase coil driver signals, for rotating or moving the roller. The roller may be used as a part of mobile, office, factory or military equipment, such as a joystick.

30 Claims, 7 Drawing Sheets

TRANSDUCER FEATURING MAGNETIC ROTOR CONCENTRICALLY ARRANGED IN RELATION TO MULTI-PHASE COIL

BACKGROUND OF THE INVENTION

1. Field of Invention

The present invention relates to a user interface in mobile, office, factory or military equipment.

2. Description of Related Art

Data input devices having rollers are known in the art. One problem with the roller known in the art is that it needs to use encoders with sliding contacts; and the size can also be a problem. The mechanical encoder needs space for sliding contacts, and if the contacts are inside the roller wheel, the diameter becomes quite large. If the encoder is outside the roller wheel, there are problems because of a long shaft (industrial design) and sealing. The mechanical feedback to the user is poor in mechanical rollers. It is not possible to control the behavior of the known roller by software.

Moreover, the mechanical roller known in the art has mechanical signal switching, and after filtering the signal is microprocessor compatible; and the level of the signal is independent of the speed of movement in practice. However, the sliding contacts quickly wear; sliding contacts generate unwanted signals too that must be filtered; and the mechanical feedback to the user is passive and has to be generated by a mechanical wearing system.

Other data input devices are also known in the art. For example, WO 98/30971 discloses one such device having a rotatable ball with indented interaction means on the surface thereof. The rotatable ball is mounted in a body having different combinations for exerting force on the rotatable ball, including a spring and a ball combination; and a core, coil, switch, voltage source and magnet combination.

SUMMARY OF INVENTION

The invention provides a transducer or roller that may be used as a sensor of a force or as a driver for providing a force.

When used as a sensor, the transducer or roller responds to a force applied by a user, for providing a multi-phase coil signal containing information about the force applied by the user. The transducer or roller has a magnetic rotor in combination with a multi-phase coil member. In operation, the magnetic rotor responds to the force applied by the user, for providing a magnetic rotor force. The multi-phase coil member responds to the magnetic rotor force, for providing a multi-phase coil signal containing information about the force applied by the user. The force applied by the user may include a rotational force applied by the user to a track ball or any force applied by the user to a mouse that causes the transducer or roller to move or rotate. In this case, the multi-phase coil signal contains information about the force applied by the user on the track ball or the mouse. The multi-phase coil member includes three or more coils. The transducer or roller may be used as a part of mobile, office, factory or military equipment, such as a joystick.

Alternatively, when used as a driver, the transducer or roller responds to roller driving signals, for example directly or indirectly from a host system, for rotating the transducer or roller about a main roller axis. In this case, the multi-phase coil member responds to the roller driving signals, for providing multi-phase coil driver signals. The magnetic rotor responds to the multi-phase coil driver signals, for rotating or moving the transducer or roller.

The roller may be used as a part of a roller system used in combination with the host system or other electrical circuitry.

In effect, the roller in itself bears a strong resemblance to a stepper motor. The roller is used mainly as a synchronous generator, which outputs a three-phase voltage. From the three-phase voltage, it is possible to get information about the amount and direction of movement of the roller or transducer.

One advantage of the present invention is that there is no need to use an encoder with sliding contacts. The only wearing parts are bearings between the magnetic rotor and the multi-phase coil member. Another advantage is that the overall structure is quite simple.

DETAILED DESCRIPTION OF INVENTION

Figure 1A:
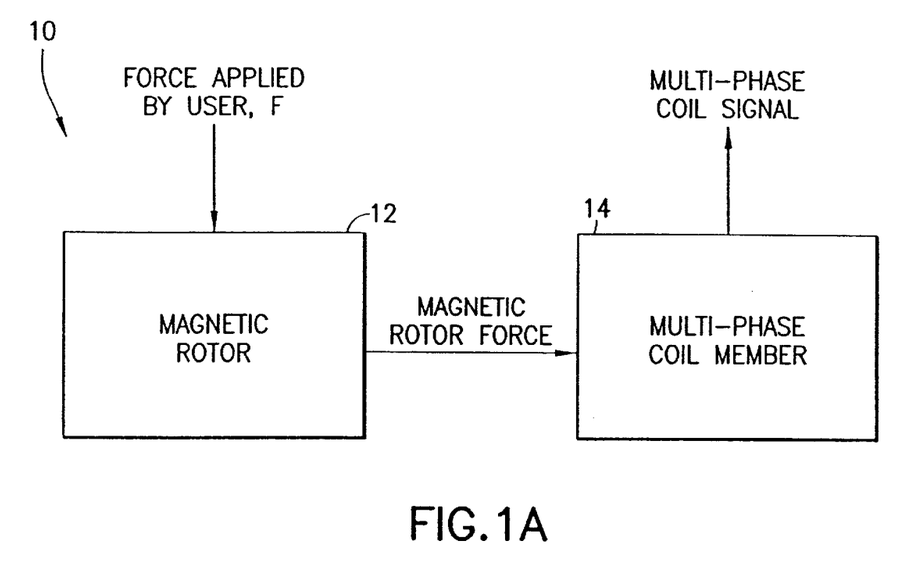
FIGS. 1A, 1B are block diagrams a roller or transducer that is the subject matter of the present invention.
Figure 1B:
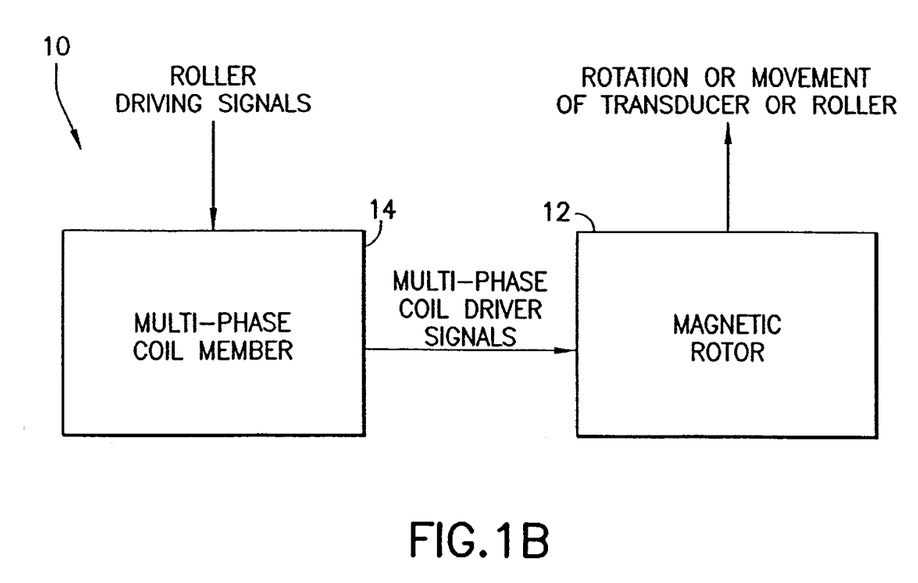

FIGS. 1A, 1B: The Basic Invention

FIGS. 1A, 1B show the basic invention, which includes a transducer or roller generally indicated as 10 that may be used as a sensor of a force or as a driver for providing a force.

In FIG. 1A when used as a sensor, the transducer or roller 10 responds to a force F applied by a user, for providing a multi-phase coil signal containing information about the force applied by the user. The transducer or roller 10 has a magnetic rotor 12 in combination with a multi-phase coil member 14. The magnetic rotor 12 responds to the force F applied by the user, for providing a magnetic rotor force. The multi-phase coil member 14 responds to the magnetic rotor force, for providing a multi-phase coil signal containing information about the force F applied by the user. The force F applied by the user may include a rotational force applied by the user to a track ball (not shown) or any force applied by the user to a mouse (not shown) that causes the transducer or roller to move or rotate. In this case, the multi-phase coil signal contains information about the force F applied by the user on the track ball (not shown) or the mouse (not shown). The transducer or roller 10 may be used as a part of mobile, office, factory or military equipment, such as a joystick, all now shown.

In FIG. 1B, when used as a driver, the transducer or roller 10 responds to roller driving signals, for example directly or indirectly from a host system or other electrical circuitry discussed below, for rotating the transducer or roller 10 about a main roller axis. In this case, the multi-phase coil member 14 responds to the roller driving signals, for providing multi-phase coil driver signals. The magnetic rotor 12 responds to the multi-phase coil driver signals, for rotating or moving the transducer or roller 10.

The transducer or roller 10 shown in FIGS. 1A, 1B may be used as a sensor or a driver in a roller system in combination with the host system or other electrical circuitry, as discussed below.

Figure 2:
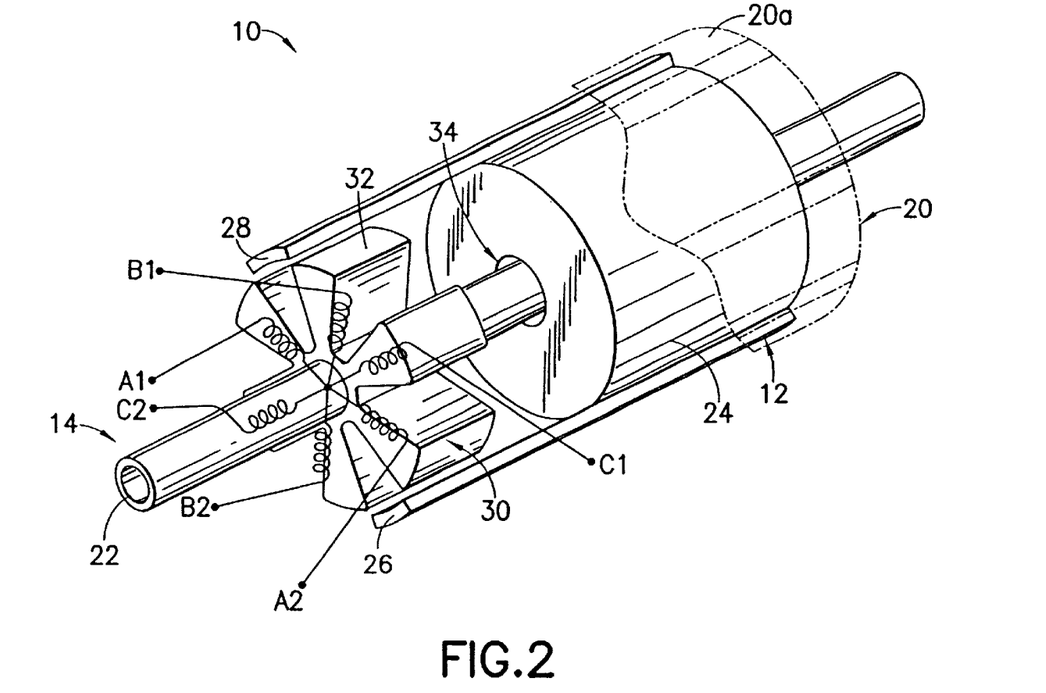
FIG. 2 is a diagram of the roller or transducer that is the subject matter of the present patent application.

FIG. 2: The Roller 10

FIG. 2 shows the main principle of the roller 10, which includes a tubular shaft 20 that can be rotated around the roller main axis 22 and is attached to a body or frame (not shown) of a device (not shown) having the roller 10 installed therein. The tubular shaft 20 has an outside surface for a roller wheel and mechanical support (no bearing shown).

The magnetic rotor 12 includes a permanent magnet 24 having two permanent magnet extenders 26, 28. The tubular shaft 20 has an outside surface 20a for contacting by the user (not shown), a track ball (not shown), a ball (not shown) in a mouse (not shown).

Figure 3A:
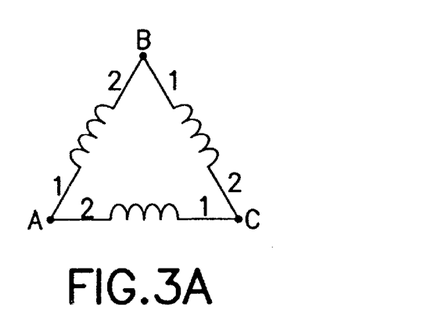
FIG. 3A, 3B are diagrams of a three-phase connection of windings of the roller or transducer in FIG. 2.
Figure 3B:
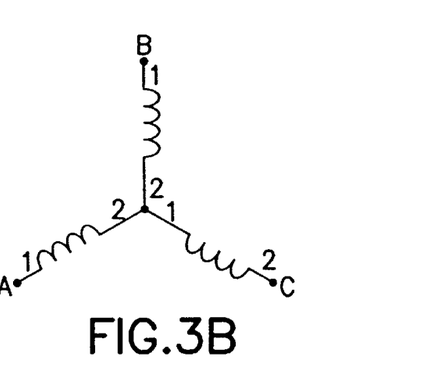

As shown, the multi-phase coil member 14 includes the roller main axis 22 and a three-phase coil 30 arranged thereon. The three-phase coil 30 has a ferromagnetic core 32 and three windings indicated as $A_1$, $A_2$, $B_1$, $B_2$, $C_1$, $C_2$. The main roller axis 22 is hollow for receiving electrical wires from the windings $A_1$, $A_2$, $B_1$, $B_2$, $C_1$, $C_2$. The three windings $A_1$, $A_2$, $B_1$, $B_2$, $C_1$, $C_2$ have six ends connected as a delta connection (FIG. 3A) or as a star connection (FIG. 3B). Alternatively, the multi-phase coil member 14 may also have four windings for providing four winding signals to be signal processed in order to detect a phase difference therebetween.

The magnetic rotor 12 is concentrically arranged in relation to and rotatably cooperates with the multi-phase coil member 14 via bearings generally positioned in a location indicated by arrow 34 as shown in FIG. 2. In one embodiment, the bearings may be a part of the magnetic rotor 12, for rotating the magnetic rotor 12 about the multi-phase coil member 14. Alternatively, the bearings may be a part of the multi-shape coil member 14, for rotating the magnetic rotor 12 about the multi-phase coil member 14. Moreover, the bearings may be a separate part of the transducer or roller 10. Moreover, in addition to the bearings, there may be some sealing means as well.

In operation, the magnetic rotor 12 conducts the magnetic flux. The three-phase coil 30 is attached to the roller main axis 22, and, therefore, it is stable and the wiring is easy to make. The three electrical windings $A_1$, $A_2$, $B_1$, $B_2$, $C_1$, $C_2$ can be inside the roller main axis 22, protected from the environment. The roller 10 tends to stop at positions defined by the magnetic poles of the three-phase coil 30.

FIGS. 4–7: The Electrical Circuitry

FIGS. 4–7 show three different ways for connecting the roller 10 to a digital or microprocessor circuit environment.

As discussed above, since the three original coils or windings $A_1$, $A_2$, $B_1$, $B_2$, $C_1$, $C_2$ have six ends, there will be only three wires to connect outside from the roller component.

Figure 5:
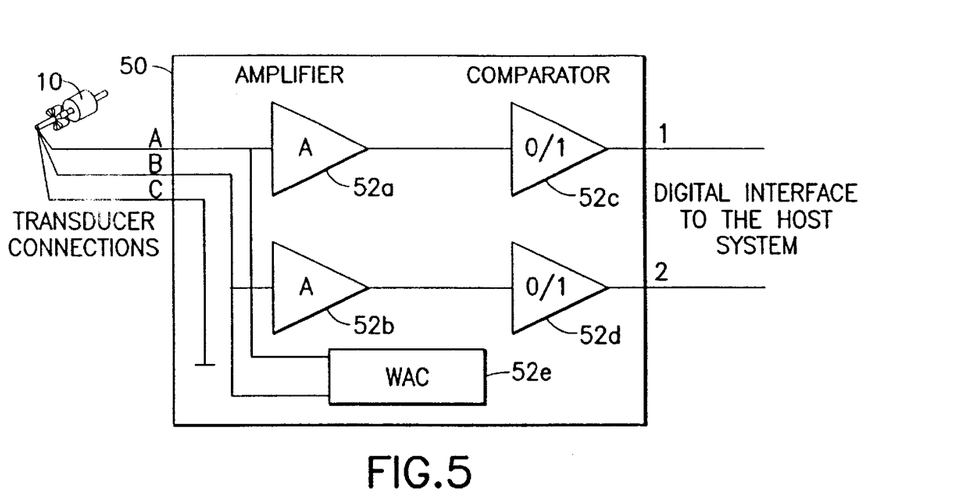
FIG. 5 is a diagram of a pulse shaper interface circuit used in the roller system in FIG. 4.

There are many different ways of using a three-phase magnetic roller, as discussed in detail below:

FIG. 5: Conventional Use of Roller

Figure 4:
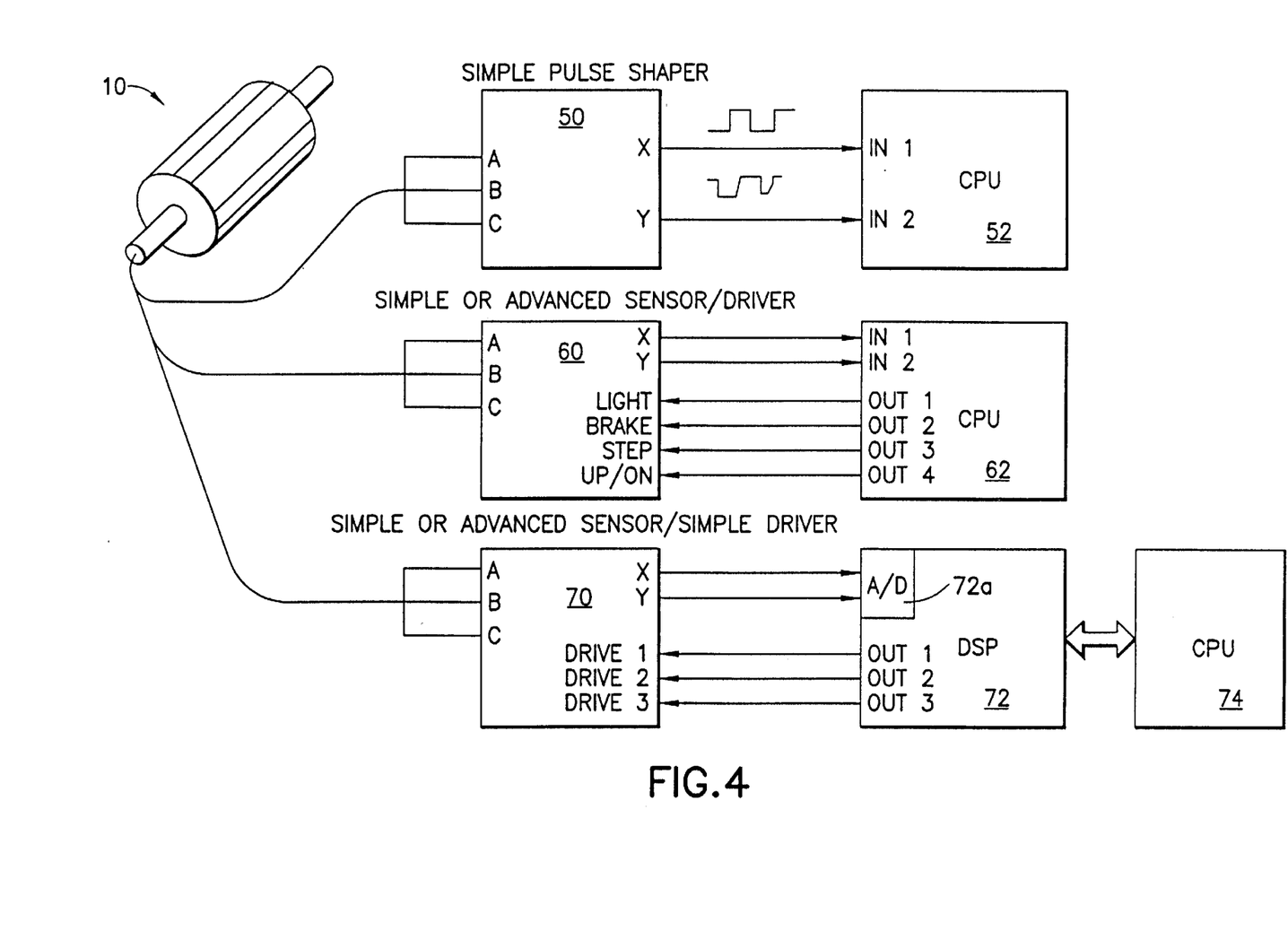
FIG. 4 is a diagram of a roller system using the roller or transducer in FIG. 2.

FIGS. 4 and 5 show a first way to connect the roller 10 via transducer connections A, B, C to a simple pulse shaper circuit 50 connected to a central processing unit 52. As shown, the roller 10 is connected to the microprocessor circuit environment with an active or passive pulse shaping circuit. In FIG. 5, one of the roller lines is connected to a fixed potential, and the remaining two electrical lines are connected to a limiting amplifier 50a, 50b inside the pulse shaper circuit 50. The outputs from the limiting amplifier 50a, 50b are provided to comparators 52c, 52d having output lines connected to the central processing unit 52, which is coupled to the host system (not shown). In FIG. 5, the simple pulse shaper circuit 50 also includes a wake-up call circuit (WAC) 52e that starts the functions of the interface circuit that are needed to generate and send digital signals to the host system when the roller is being used; otherwise, the WAC 52e keeps the interface circuit in a shutdown mode to save power.

In summary, in FIG. 5 the interface circuit 50 needs an amplifier to guarantee the operation in all reasonable speeds of rotation. Very important for portable devices is the wake-up circuit (WAC) 52e, which has virtually no idle current consumption. The WAC 52e can be a separate circuit block or an intrinsic feature of the amplifier. The amplifiers 52a, 52b have a high amplification and limit and shape the signal to certain digital signal levels. The amplifiers 52a, 52b also act as a comparator, so there are only certain voltage levels in the output of the interface circuit. For simplicity, the third line from the roller key transducer is connected to a fixed common potential.

Figure 6:
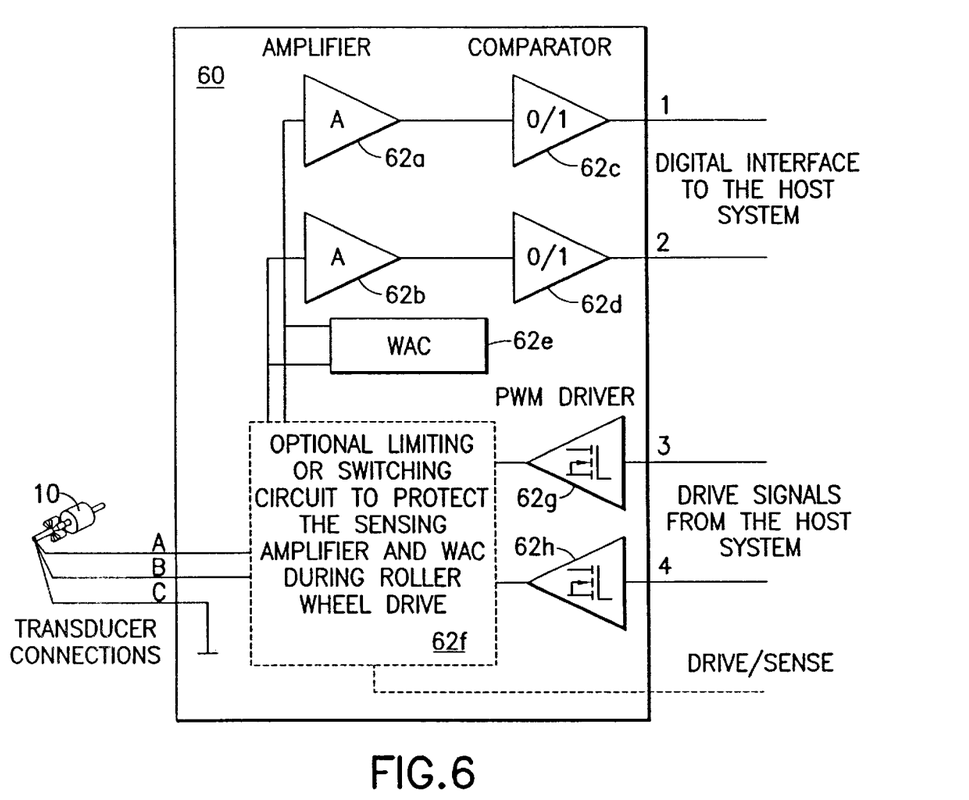
FIG. 6 is a diagram of a sensor/driver interface circuit used in the roller system in FIG. 4.

FIG. 6: Roller and Digital Interface

FIGS. 4 and 6 show a second way to connect the roller 10 via transducer connections A, B, C to a simple or advanced sensor/driver circuit 60 connected to a central processing unit 62. In FIG. 6, the simple or advanced sensor/driver circuit 60 has limiting and sensing amplifiers 62a, 62b because the same three lines are used for providing roller driver signals to the roller 10. The simple or advanced sensor/driver circuit 60 also has comparators 62c, 62d and a wake-up call circuit 62e, similar to that discussed above in relation to FIGS. 4–5. The simple or advanced sensor/driver circuit 60 has an optional limiting or switching circuit 62f to protect the sensing amplifiers 62a, 62b, and the wake-up call circuit 62e during the roller wheel drive; and pulse wave modulation drivers 62g, 62h that receive roller driver signals from the host system (not shown). The optional limiting or switching circuit 62f responds to a drive/sense control signal from the host system (not shown) to control whether the roller is in the driver or sensor mode. In operation, the roller 10 will not be driven at the same time when it is being used as a sensor. The "driving instructions" from the central processor unit 62 generate signals to the roller lines, and these signals may depend on the position of the roller 10. If the central processing unit (i.e. microprocessor) 62 takes care of the proper timing, the simple or advanced sensor/driver circuit 60 can have a simpler circuit design. As shown, the roller driving signals from the central processing unit 62 to the simple or advanced sensor/driver circuit 60 may include a light roller signal, a roller brake signal, a roller step signal, a roller on/off signal, or a combination thereof (as shown).

In operation, the interface circuit 60 in FIG. 6 converts the roller signals to proper digital signals and drives the roller circuitry as instructed from the microprocessor circuit environment. The instructions can be simply transferred via a few lines. For example, if the user is browsing a list of names in the phone book, when he wants to scroll quickly, and moves the roller quickly, the interface system helps the roller to move. When the user is at the end of the list, the roller brakes and becomes harder to move. The roller 10 can also be instructed to step one click at a certain direction or roll by itself at least for demonstration purposes. The roller 10 can also inform the user by vibrating.

In summary, the easiest way to sense and drive using the roller 10 is to perform sensing only, when the driving is inactive. Also, the sensing lines may be protected by the limiting or switching circuit. The driving of the roller is made easy by using PWM (Pulse Width Modulation). If the microprocessor unit can use the information of the last state of the signals obtained from the interface, then the interface circuit 60 doesn't need any memory or a state machine.

Another possibility is to make the sensing/driving circuitry more complex and have a simpler software design. In that case, there should be a state machine, some kind of memory, which doesn't have to know the absolute position of the roller wheel, but the phase of the electromagnetic system. The phase information would be needed to supply a correct drive current to the coil. For example, if the host system wants to rotate up, it is desired that the wheel moves up, not first down and after that up or stop. Even in this complex case, independent timing systems are not needed to the sensing/driving circuit, because the needs of simple timing could be performed otherwise in a microprocessor circuit environment.

Figure 7:
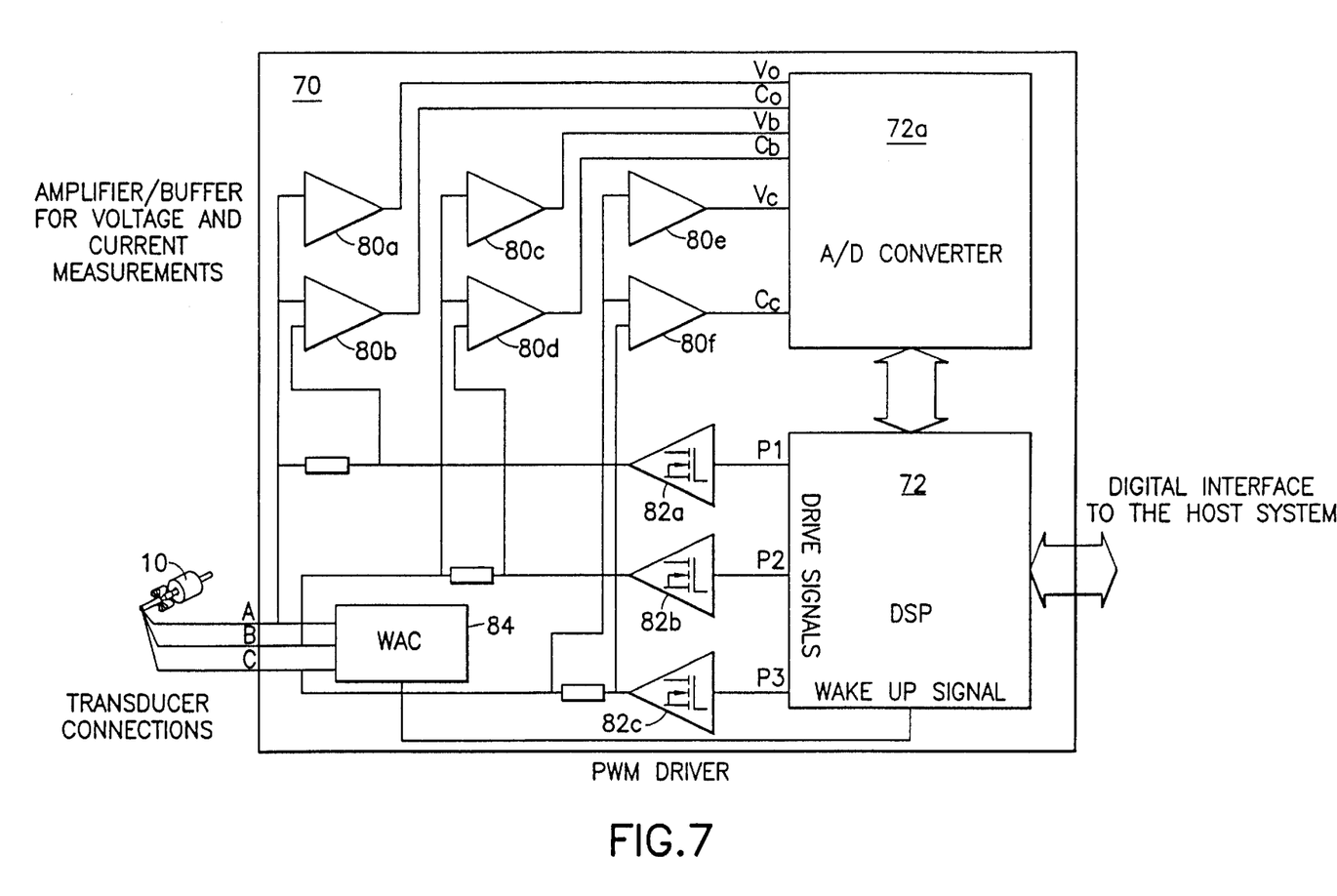
FIG. 7 is a diagram of a sensor/driver interface circuit used in the roller system in FIG. 4.

FIG. 7: Full Software Control

FIGS. 4 and 7 show a third way to connect the roller 10 via transducer connections A, B, C to a simple or advanced sensor/simple driver circuit 70 and a digital signal processing device 72 connected to a central processing unit 74, for providing full software control with a simple interface circuit, and for providing an amplifier/buffer for voltage and current measurement. The simple or advanced sensor/simple driver circuit 70 may have an amplifier (if needed) that gives the signals from the roller 10 to an A/D-converter 72a in the digital signal processor 72. The digital signal processor 72 provides the "driving instructions", for example, in a Pulse Width Modulation (PWM) or sigma/delta format. Then only a driver amplifier is needed to supply current to the roller 10. As shown, the roller driving signals from the central processing unit 72 to the simple or advanced sensor/simple driver circuit 70 may include a first drive signal, a second drive signal, a third drive signal, or a combination thereof.

For full control, the simple or advanced sensor/simple driver circuit 70 has measuring amplifiers 80a, 80b, 80c, 80d, 80e, 80f connected to the transducer lines for voltages and currents in each line. The measuring amplifiers 80a, 80b, 80c, 80d, 80e, 80f can be connected using common mode or differential connections. (Common mode: The Currents and voltages are compared to a common reference point. Differential mode: The currents and voltages are measured between the transducer interface lines.) The connection type can be selected depending on the actual case. The measuring amplifier outputs are connected to the A/D Converter 72a which converts the signals to digital values. The values of the measuring amplifier outputs from the A/D Converter 72a are stored in the memory of the DSP Controller 72 and can be used immediately for knowing the state of the roller 10 in DSP Controller 72. The DSP Controller 72 reports to the host system all the variables that need to be known in the host system.

The host system sends the driving instructions to the DSP Controller 72. The DSP Controller 72 makes the drive signals according to the instructions and the state variables of the roller. The drive signals (analog or digital, probably PWM in mobile case) are connected to the drive amplifiers or simply drivers 82a, 82b, 82c. The drivers 82a, 82b, 82c can be connected using common mode or differential architecture. (But the transducer drive current always uses transducer lines and at least two drivers, one to source and one to sink.) The drivers 82a, 82b, 82c are also used for roller click feeling adjustment.

The WAC 84, as described above, wakes the system when the roller 10 is activated by the user.

In effect, the roller 10 can be implemented with full software control (needs signal processing power for roller). The number of magnetic steps cannot be controlled, but almost everything else can be, by software. In fact, the steps can be controlled, but it makes no sense in a portable low-power hand-held device. The special interface is only perhaps an integrated amplifier for roller signals and a driver for controlling the feedback. (If the roller is big, it could be used for charging. Nowadays big rotating machines can be braked and the energy is supplied back to the network. But it is desirable to have a small roller.) The user can open the roller settings from the menu and control the feeling and behavior in different applications. All the features in the previous paragraph are possible too.

In summary, the best sensing configuration would need analog amplifiers in the sensing lines, not limiting or pulse shape features. The analog signals would be sampled and converted to a digital format by an A/D converter. Therefore, the simple DSP controller could have the information of the position (phase), the speed and the acceleration of the roller wheel. The driving of the roller could use a full three-phase PWM control. All the characteristics would be software controlled within the boundary conditions.

The Basic Operation

In operation, the roller 10 can be used as a synchronous generator or motor. The interface circuits shown and described above amplifies the three-phase signal and makes proper pulses for the microprocessor. The interface circuit can also drive the roller (brake or help its movement or move it up or down). The sharing of the functionality between the interface circuitry and the microprocessor environment depends on the amount of digital processing power which is allowed to be used and the amount of software control.

The same kind of roller sensing/driving system can be used also with a linear transducer. The linear transducer can be useful if the associate movement is linear or less than a full turn and the mechanical shape of the transducer fits well in the application.

Some ways that the roller of the present invention solve some of the drawbacks of rollers known in the art include:

(1) The more the permanent magnet has poles (from 2, of course, to the number of claws in the three-phase coil), the stronger is the stopping force of the roller.

(2) Advanced use of the roller includes extra features (full or digital control (light mode, brake, stop, roll, vibrate)).

(3) Internal mechanical contact is only in the bearings.

(4) There is no need to use any sliding contacts. The electrical interface of the roller itself is three lines. It can be connected with wires or a flex. They can be put inside the axis or beside it.

(5) There are no separate parts needed outside the roller (except the circuitry). The bearings can be inside the permanent magnet or at the ends of the roller wheel tube.

(6) The indication of the direction is reliable, because there is the floating three-phase system. The information is in the phase difference of the signals. (The three-phase system can be grounded to a common reference point from star centerpoint or one of the three lines.)

(7) The roller can be protected from external electromagnetic fields. (very good magnetic protection makes the roller heavy and bigger.)

(8) The size can be made smaller using axial construction. This means that the coil is an axial type, i.e., the axes of windings are parallel to the roller main axis, and the permanent magnet is face-to-face with the coil. That would cause axial forces, and the tolerances would be more difficult to handle. Also, the efficiency and the maximum force could decrease, while still working with the multipole permanent magnet.

Figure 8:
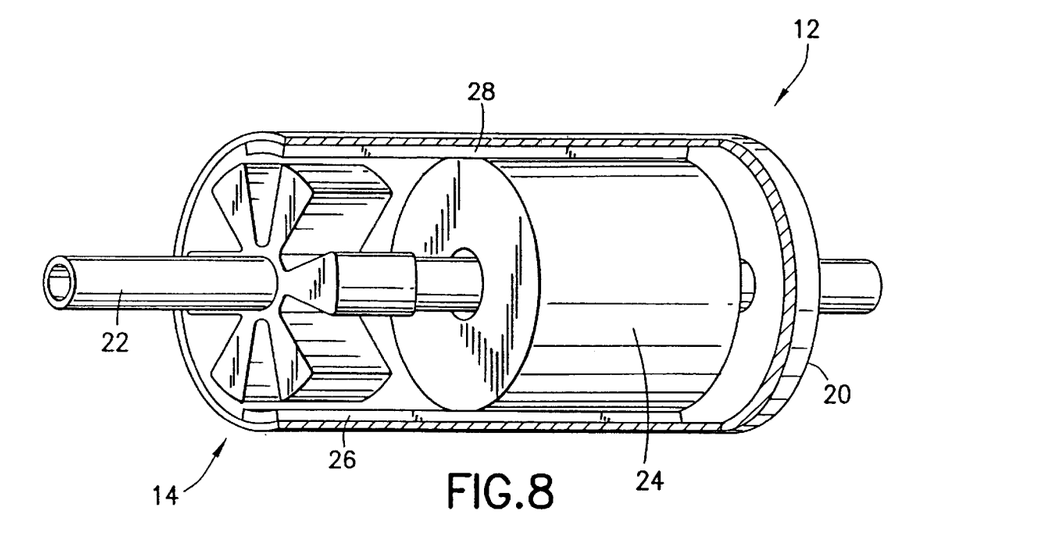
FIG. 8 is a computer drawn picture of a roller or transducer similar to the one shown in FIG. 2.
Figure 9:
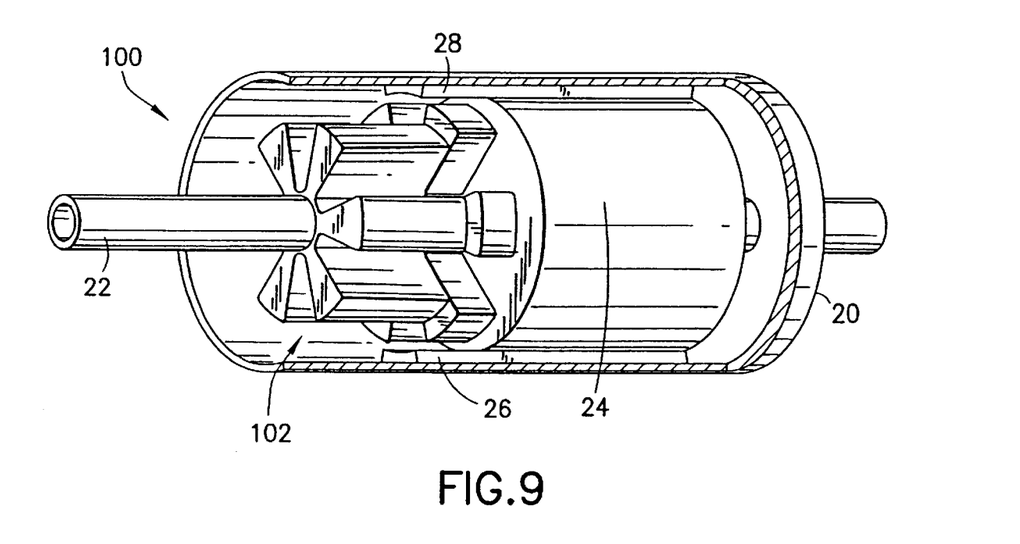
FIG. 9 is a computer drawn picture of a roller or transducer having an axial coil design.

FIGS. 8–9: The Axial Coil Design

FIG. 8 shows a computer-rendered drawing of a roller similar to that shown in 2.

In comparison, FIG. 9 shows a computer-rendered drawing of a roller 100 with an axial coil design generally indicated as 102. As shown, the coil 102 of the roller or transducer 100 is made in an axial form. The coil 102 itself is axial but the air gap between the permanent magnet 24 and the coil 102 can be in a radial construction to avoid axial forces and associated problems with tolerances and the bearings.

The Four Windings Design

It is also possible to use a coil, having four windings. The sensing information is the same as with a three-phase coil, only the phase difference of the signals, compared to each other, is different. In any case, at least three wires are needed to connect the roller transducer coil to the sensing/driving system.

The roller described herein can be made quite small, but ergonomics has to be taken into account also. For example, the roller can be made bigger to be used, for example, by disabled persons, children and those having rheumatic pain.

Figure 10:
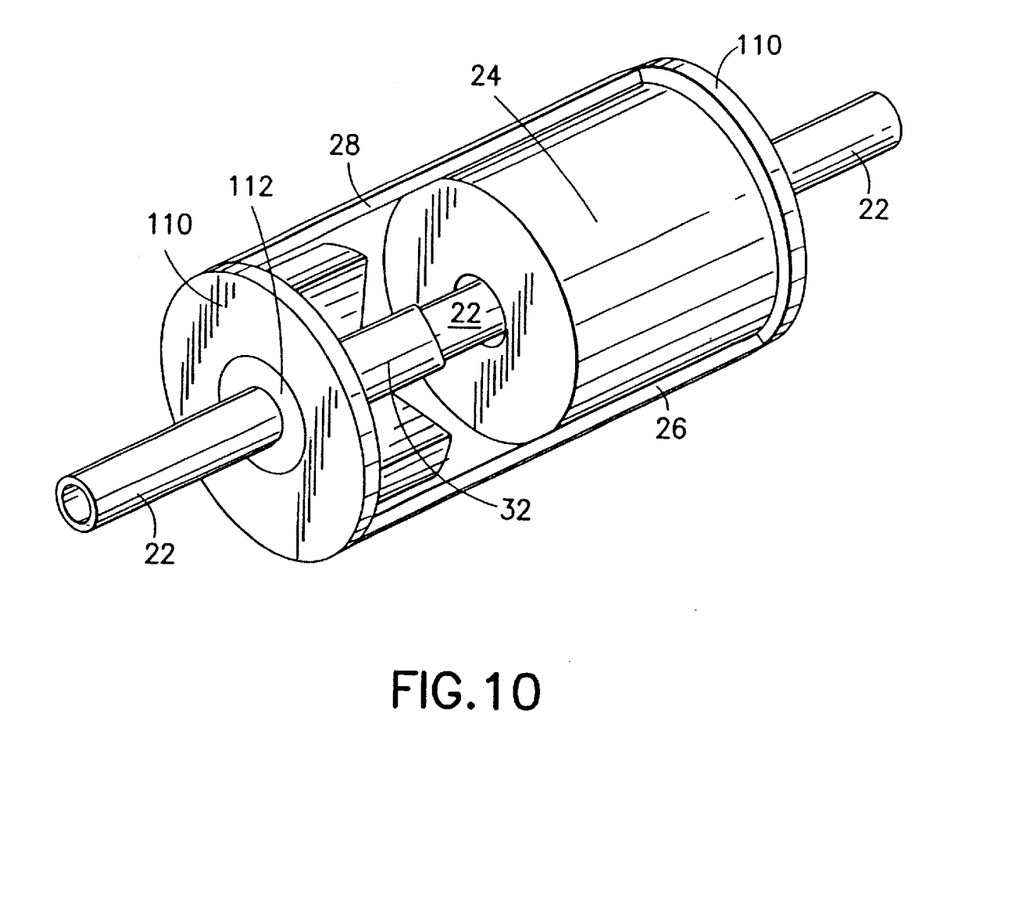
FIG. 10 is a diagram of an embodiment of a roller or transducer having bearings and a seal that is the subject matter of the present patent application.

FIG. 10: Bearings and Seal

FIG. 10 shows an arrangement having bearings 110 and a seal 112. As shown, the bearing 110 can be simply a plastic spacer which touches the metallic main roller axis. In heavy duty applications, a ball bearing can be used. In the bearing spacer 110, there is also a space for a seal 112. The seal 112 can be made of rubber or teflon, for example. The seal 112 material can be used to control damping. The damping has a significant effect on the feeling that the roller has. But to save energy, at least in active use, it may be best to keep the mechanical friction as low as possible and tune the damping and the feeling electrically, for example, by connecting suitable resistive load to roller coils. The interface circuit can do that and, therefore, control the roller click feeling.

Typical Applications

Typical applications may include industrial, commercial, medical equipment and military.

The industrial applications include vehicle user interface (forklift, harvester); industrial equipment user interface (process industry, material handling devices) and robot control.

The commercial applications may include virtual realty devices (linear transducers for virtual gloves); electronic toys (interactive rotating parts); interactive joystick and mouse; mobile phones and communicators; and electric home appliances (microwave ovens, etc.).

The medical equipment applications may include a rehabilitation exerciser.

The military applications may include a sophisticated radar trackball transducer.

Finally, the roller or transducer can be mechanically connected to a joystick or other one-, two-or three-dimension systems. The linear transducer construction can easily be used for two or three dimensions, because the moving parts (the magnets) can be connected and also integrated into a single moving entity.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

I claim:

1. A transducer, comprising:
    a magnetic rotor having a permanent magnet with two permanent magnet extenders, responsive to a force applied by a user, for providing a magnetic rotor force; and
    a multi-phase coil member arranged concentrically in relation to the magnetic rotor, responsive to the magnetic rotor force, for providing a multi-phase coil signal containing information about the force applied by the user.

2. A transducer according to claim 1, characterized in that the multi-phase coil member includes a tubular shaft having a three-phase coil with a ferromagnetic core is and windings.

3. A transducer according to claim 2, characterized in that the magnetic rotor includes a tubular shaft having an outside surface for contacting by the user.

4. A transducer according to claim 1, characterized in that the magnetic rotor includes a tubular shaft having an outside surface for contacting by the user.

5. A transducer according to claim 1, characterized in that the multi-phase coil member includes windings having electrical wires; and
    the multi-phase coil member includes a main roller axis that is hollow for receiving the electrical wires.

6. A transducer according to claim 1, characterized in that the multi-phase coil member includes three windings having six ends connected as a delta connection.

7. A transducer according to claim 1, characterized in that the multi-phase coil member includes three windings having six ends connected as a star connection.

8. A transducer according to claim 1, characterized in that the multi-phase coil member responds to roller driving signals from a limiting and sensing amplifier, for providing multi-phase coil driver signals; and
    the magnetic rotor responds to the multi-phase coil driver signals, for moving the roller.

9. A roller system having a roller, the roller comprising:
- a magnetic rotor having a permanent magnet with two permanent magnet extenders, responsive to a force applied by a user, for providing a magnetic rotor force; and
- a multi-phase coil member arranged concentrically in relation to the magnetic rotor, responsive to the magnetic rotor force, for providing a multi-phase coil signal containing information about the force applied by the user.

10. A roller system according to claim 9, characterized in that the roller system further comprises: an pulse shaper circuit having a fixed potential connected to one line of the multi-phase coil member, and having two limiting amplifiers respectively connected to two lines of the multi-phase coil member.

11. A roller system according to claim 9, characterized in that
- the multi-phase coil member has three lines;
- the roller system further comprises: a limiting and sensing amplifier for using the three lines for providing roller driving signals to drive the roller;
- the multi-phase coil member responds to the roller driving signals, for providing multi-phase coil driver signals; and
- the magnetic rotor responds to the multi-phase coil driver signals, for moving the roller.

12. A roller system according to claim 11, characterized in that the roller driving signals include a light roller signal, a roller brake signal, a roller step signal, a roller on/off signal, or a combination thereof.

13. A roller system according to claim 9, characterized in that
- the roller system further comprises: a shaper circuit, a microprocessor for providing software control, and a digital signal processor for providing driving instruction signals to the roller.

14. A roller system according to claim 9, characterized in that the roller system further comprises: an interface circuit having a fixed potential connected to one line of the multi-phase coil member, and having two limiting amplifier respectively connected to two lines of the multi-phase coil member.

15. A roller system according to claim 14, characterized in that the interface circuit includes two comparators, each for responding to a respective one of the two limiting amplifiers.

16. A roller system according to claim 14, characterized in that the roller system includes a pulse wave modulation driver circuit having a wake-up call circuit; amplifiers and buffers for voltage and current measurement; analog/digital converters for converting analog voltage and current measurement signals into digital voltage and current measurement signals; a digital signal processor for responding to pulse wave modulation driver signals from a host system, for providing driver signals; and pulse wave modulation driver for providing the driver signals to the roller.

17. A roller system according to claim 9, characterized in that
- the interface circuit includes a limiting or switching circuit and two pulse wave modulation drivers;
- the two pulse wave modulation drivers for providing two pulse wave modulation driver signals; and
- the interface circuit being connected to the two amplifiers, responding the two pulse wave modulation driver signals, protecting the two amplifiers the driving of the roller, for the two pulse wave modulation driver signals to the roller.

18. A roller for a user interface device such as a mouse or trackball having an element that is moved by a user, comprising:
- a magnetic rotor having a permanent magnet with two permanent magnet extenders, responsive to a force applied by the element that is moved by the user, for providing a magnetic rotor force; and
- a multi-phase coil member arranged concentrically in relation to the magnetic rotor, responsive to the magnetic rotor force, for providing a multi-phase coil signal containing information about the force applied by the element that is moved by the user.

19. A roller according to claim 18, characterized in that the magnetic rotor is a tubular shaft having an outside surface for contacting the element that is rolled by the user.

20. A roller according to claim 18, characterized in that the multi-phase coil member includes a main roller axis that is hollow for receiving the electrical wires.

21. A roller according to claim 18, characterized in that the information about the force applied by the element that is moved by the user includes information about the amount and direction of movement of the element.

22. A roller according to claim 18, characterized in that the multi-phase coil member includes a three-phase connection of windings having a delta formation.

23. A roller according to claim 18, characterized in that the multi-phase coil member includes a three-phase connection of windings having a star formation.

24. A sensor/driver comprising:
- a magnetic rotor having a permanent magnet with two permanent magnet extenders, responsive to a force applied by a user, for providing a magnetic rotor force, and further responsive to multi-phase coil driver signals, for moving the roller; and
- a multi-phase coil member arranged concentrically in relation to the magnetic rotor, responsive to the magnetic rotor force, for providing a multi-phase coil signal containing information about the force applied by the user, and further responsive to roller driving signals, for providing the multi-phase coil driver signals.

25. A sensor/driver according to claim 24, characterized in that the multi-phase coil member includes a tubular shaft having a three-phase coil with a ferromagnetic core and windings.

26. A sensor/driver according to claim 24, characterized in that
- the multi-phase coil member includes windings having electrical wires; and
- the multi-phase coil member includes a main roller axis that is hollow for receiving the electrical wires.

27. A sensor/driver according to claim 24, characterized in that the multi-phase coil member includes three windings having six ends connected as a delta connection.

28. A sensor/driver according to claim 24, characterized in that the multi-phase coil member includes three windings having six ends connected as a star connection.

29. A transducer, comprising:
- a magnetic rotor having a permanent magnet with two permanent magnet extenders, responsive to a force applied by a user, for providing a magnetic rotor flux; and
- a multi-phase coil member arranged concentrically in relation to the magnetic rotor, responsive to the magnetic rotor flux, for providing a multi-phase coil signal containing information about the force applied by the user.

30. A transducer according to claim 29, characterized in that the multi-phase coil member includes a tubular shaft having a three-phase coil with a ferromagnetic core and windings.

* * * * *

UNITED STATES PATENT AND TRADEMARK OFFICE
CERTIFICATE OF CORRECTION

PATENT NO. : 6,483,294 B1  Page 1 of 1
DATED : November 19, 2002
INVENTOR(S) : Jari Kirjanen It is certified that error appears in the above-identified patent and that said Letters Patent is hereby corrected as shown below:

Column 3,
Line 47, "multi-shape" should be -- multi-phase --.

Signed and Sealed this

Sixth Day of May, 2003

JAMES E. ROGAN
*Director of the United States Patent and Trademark Office*